Mar. 5, 1929.　　　F. P. LIVINGSTON　　　1,703,889
ANGLE COCK
Filed Feb. 2, 1927
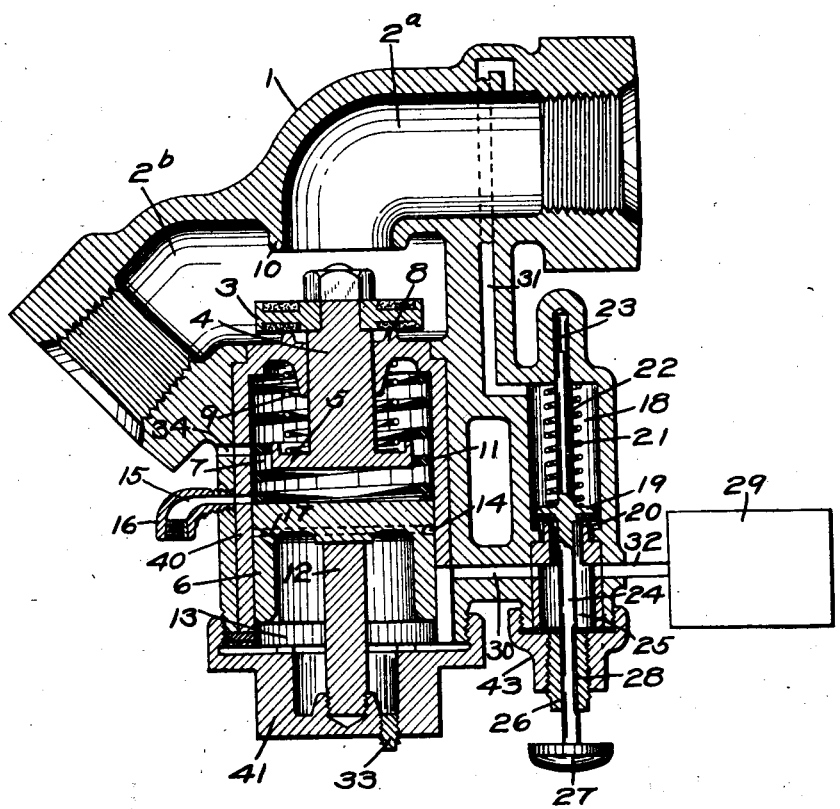
INVENTOR
FREMONT P. LIVINGSTON
BY *Wm. M. Cady*
ATTORNEY Patented Mar. 5, 1929.

1,703,889

UNITED STATES PATENT OFFICE.

FREMONT P. LIVINGSTON, OF DENVER, COLORADO, ASSIGNOR TO THE WESTINGHOUSE AIR BRAKE COMPANY, OF WILMERDING, PENNSYLVANIA, A CORPORATION OF PENNSYLVANIA.

ANGLE COCK.

Application filed February 2, 1927. Serial No. 165,384.

This invention relates to fluid pressure brakes and more particularly to an angle cock device such as employed to control communication through the brake pipe of a fluid pressure brake system.

If the usual angle cock device, in the brake pipe at one end of a car, is turned so as to close communication through the brake pipe on a train, the operator's control of the car brakes back of the closed angle cock is lost. Especially in passenger train service, where train speeds are high, if an angle cock device is closed without the knowledge of the train operator, the operator may attempt to effect a brake pipe reduction in order to apply the brakes, but due to the closed angle cock, the brake pipe pressure on cars back of the closed angle cock will not be reduced, and consequently the brakes will not be applied on these cars, which may result in running past signals set at danger, or across closed crossings, or the wrecking of a train by running into a train ahead.

On account of the possibility of an angle cock being either accidentally or maliciously closed on a passenger train, it has been proposed to eliminate the angle cock devices in such service and to close the open end of the brake pipe on the last car in a train, by employing a dummy hose coupling. However, when there are no angle cock devices in the brake pipe, whenever the brake pipe is disconnected between cars, as in the switching of cars and the making up of trains as at terminals, the fluid under pressure in the brake pipe is completely vented to the atmosphere, so that the brake pipe has to always be recharged and the train brakes released before said train can be moved.

The principal object of my invention is to provide an angle cock device, adapted to normally maintain open communication through the brake pipe, but having manually operable means, whereby communication through the angle cock device may be temporarily closed, so as to permit such operation as disconnecting the brake pipe between cars, switching of cars, and the making up of trains, without loss of fluid under pressure. After a limited time, however, the angle cock automatically opens communication through the brake pipe.

As shown in the drawing, the single figure is a central, sectional view of an angle cock device, embodying my invention.

According to the drawing, the angle cock device may comprise an angle fitting 1, having a passage $2^a$ adapted to be connected to the brake pipe proper and a passage $2^b$ on an angle and adapted to be connected to the usual flexible hose.

Controlling communication between the passages $2^a$ and $2^b$ is a double seating valve 3, and secured to said valve is a stem 4 which extends through an opening in the end wall of the bushing 40 and is provided with a collar 5 at the outer end. Mounted in the bushing 40 and adapted to engage the outer end of the stem 4 is a piston 6.

The double seating valve 3 is adapted to seal against a seat ring 8 in one position, being yieldingly held in said position by a coil spring 9 interposed between the collar 5 and the end wall of bushing 40. Upon movement of the valve to its opposite position, the valve is adapted to engage a seat ring 10.

The piston 6 is subject to the pressure of a coil spring 11 and is limited in its downward movement by engagement with a stop pin 12 secured centrally of a cap nut 41, and is adapted to travel a predetermined distance upward prior to engagement with the stem collar 5.

Incorporated in the angle cock device is a valve 19 contained in a chamber 18 and adapted to be normally held seated against a seat ring 20 by the pressure of a spring 21. Secured to the valve and adapted to guide said valve is a stem 22 having sliding engagement in a bore 23. Secured to the opposite side of said valve is an operating stem 24, extending through a chamber 25 and adapted to slidably extend through a bore in a plug 26, having screw-threaded engagement in a cap nut 43. The stem 24 is provided at its outer end, outside of the casing, with a push button 27, and when the valve 19 is seated, a longitudinal groove 28 in the stem 24 is adapted to connect chamber 25 with the atmosphere.

In operation, when the valve 19 is seated by the pressure of spring 21, the chamber 25 is connected to the atmosphere through the longitudinal groove 28 in the stem 24 and consequently the chamber 13 beneath the piston 6, being connected to chamber 25 by way of passage 30, is also vented to the atmosphere, so that the pressure of spring 11 holds the piston 6 in the position shown in the drawing, which permits the pressure of spring 9 against the collar 5 of the stem 4 to hold the double seating valve 3 seated against the seat ring 8. With the piston 6 against the stop 12 and with the double seating valve 3 seated as shown in the drawing, the chamber 7 is connected to the atmosphere through passage 15.

With the double seating valve open, as shown in the drawing, free communication is provided between the passageways 2ª and 2ᵇ.

If it is desired to uncouple two hose couplings between cars, the trainman operates the push button 27 to open the valve 19, so as to connect chamber 18 with chamber 25. Chamber 18 being connected to passageway 2ª through passage 31, fluid at brake pipe pressure from said passageway flows into chamber 18 and thence past the opened valve 19 into chambers 25 and thence through passage 30 to piston chamber 13. The pressure builds up in chamber 13 and is thus raised and operates to shift the piston 6 upwardly against the pressure of spring 11. Said piston engages the collar 5 of the stem 4 and shifts the double seating valve away from the seat ring 8 and into engagement with the seat ring 10, thereby closing communication between the passageways 2ª and 2ᵇ.

As soon as the double seat valve 3 is shifted against the seat ring 10, the trainman may release the push button 27 and this permits the spring 21 to again seat the valve 19. With the valve 19 seated, the longitudinal slot 28 in the valve stem 24 connects the chamber 25 to the atmosphere, so that the fluid under pressure in piston chamber 13 is permitted to slowly vent to atmosphere.

In order to increase the time required to vent the pressure acting on piston 6, a volume reservoir 29 may be connected through pipe 32 with chamber 25, so that the pressure in said reservoir as well as the pressure in chamber 13 must be reduced before the piston 6 is permitted to move downwardly. When the pressure in said reservoir and the piston chamber 13 becomes reduced to a predetermined degree, the pressure of spring 11 forces the piston 6 downwardly toward the stop 12, so that the pressure of the brake pipe fluid in passageway 2ª, acting on the double seating valve 3, inside of the seat ring 10, in addition to the pressure of the spring 9 acting against the collar 5 of the stem 4, operates to shift the valve 3 from its position against the seat ring 10, to its lower position against the seat ring 8, thereby again opening communication from passageway 2ª to passageway 2ᵇ.

The time between the closing of the valve 3 against the seat ring 10, as effected by manually opening the valve 19, and the automatic opening of said valve 3 and its seating against the seat ring 8, is governed by the rate of reduction in the pressure of the fluid in the reservoir 29 and piston chamber 13, by flow to the atmosphere through the longitudinal slot 28, and said time is made sufficient to enable a trainman to uncouple the hose couplings between two cars and to apply a dummy hose coupling, as the case may require, while loss of fluid under pressure is prevented due to the fact that the valve 3 is closed so as to prevent escape of fluid from the brake pipe.

It will be noted that this angle cock device will not remain closed unless the valve 19 is held open, so that the pressure in chamber 13 beneath the piston is maintained. Therefore, in case the valve 19 is accidentally or maliciously opened, so as to cause the valve 3 to move and seal against the seat ring 10, such seating of the valve is only temporary, and thus the valve will not be in the closed position while the train is running.

If the valve 19 should leak or accidentally stick in a partially open position and should cause a build-up of pressure on piston 6, due to the inability of the groove 28 to vent fluid at a rate sufficient to prevent such build-up, the piston 6 may be moved upwardly, but when the piston has moved upwardly a certain distance, and before engaging the stem 4, an annular groove 14 in the piston registers with the atmospheric passage 15. Said groove is connected by a port 17 with chamber 13, so that the fluid under pressure acting on piston 6 is vented to the atmosphere and prevents a further upward movement of said piston.

The annular groove 14 in the piston 6 ensures a connection from chamber 13 to the atmospheric passage 15, when said passage and groove register, irrespective of the rotative position of the piston 6.

Passage 31 is preferably connected to passageway 2ª at the upper side of the passageway, so as to prevent condensed moisture or other foreign material from passing from the passageway 2ª to the passage 31.

A plug 33 is provided in the cap nut 41, which may be removed to permit drainage of condensed moisture or other foreign material which may collect in chamber 13.

When piston 17 rises and closes the port 15 and starts to unseat valve 3, brake pipe pressure may enter chamber 7 around the stem 4 and thus tend to prevent the further upward movement of piston 17. In order to prevent the building up of pressure in chamber 7, an additional vent port 34 may be provided for maintaining the chamber 7 at atmospheric pressure.

Having now described my invention, what I claim as new and desire to secure by Letters Patent, is:—

1. A train pipe angle cock device having a conduit for the flow of fluid under pressure, a valve for controlling communication through said conduit, a piston operated by fluid under pressure for moving said valve to close said communication, manually operated means for supplying fluid under pressure to said piston, and means including a spring for effecting the opening of said valve upon release of said manually operated means.

2. A train pipe angle cock device having a conduit for the flow of fluid under pressure, a valve for controlling communication through said conduit, a piston operated by fluid under pressure for moving said valve to close said communication, manually operated means for supplying fluid under pressure to said piston, and means for venting fluid from said piston only upon release of said manually operated means to permit said valve to move so as to open communication through said conduit.

3. A train pipe angle cock device having a fluid pressure conduit, valve means for controlling communication through said conduit, manually operated means for effecting the operation of said valve means to close communication through said conduit, and means for effecting the movement of said valve means to open communication through said conduit a predetermined time after said manually operated means is released.

4. An angle cock device having a fluid pressure conduit and comprising a valve for controlling communication through said conduit, a piston operated by fluid under pressure for actuating said valve to close said communication, and a manually operated valve adapted upon manual operation to supply fluid under pressure to said piston and upon release to vent fluid from said piston.

5. An angle cock device having a fluid pressure conduit and comprising a valve for controlling communication through said conduit, a piston operated by fluid under pressure for actuating said valve to close said communication, manually operated means for supplying fluid under pressure to said piston, and means for venting fluid from said piston upon a predetermined movement thereof.

6. An angle cock device having a fluid pressure conduit and comprising a valve for controlling communication through said conduit, a piston operated by fluid under pressure upon a relative movement of said piston for actuating said valve to close communication through said conduit, manually operated means for supplying fluid under pressure to said piston, and means for venting fluid from said piston upon a predetermined movement of said piston relative to said valve.

7. A device having a conduit for the flow of fluid under pressure, valve means for controlling communication through said conduit, manually operated means for effecting the operation of said valve means to close said communication, said valve means being automatically operable to open communication through said conduit.

8. A device having a conduit for the flow of fluid under pressure, valve means for controlling communication through said conduit, manually operated means for effecting the operation of said valve means to close said communication, and means operable automatically in the absence of manual control for effecting the operation of said valve means to open communication through said conduit.

9. A device having a conduit for the flow of fluid under pressure, valve means for controlling communication through said conduit, manually operated means for effecting the operation of said valve means to close said communication, and means operated automatically a predetermined time after release of manual control for effecting the operation of said valve means to open communication through said conduit.

In testimony whereof I have hereunto set my hand.

FREMONT P. LIVINGSTON.